Dec. 28, 1943. A. F. BUSER 2,337,643

AUXILIARY HANDLE FOR SHOVELS OR THE LIKE

Filed June 28, 1943

INVENTOR.
ANTHONY F. BUSER

Patented Dec. 28, 1943

2,337,643

UNITED STATES PATENT OFFICE 2,337,643

AUXILIARY HANDLE FOR SHOVELS OR THE LIKE

Anthony F. Buser, Wichita, Kans.

Application June 28, 1943, Serial No. 492,525

1 Claim. (Cl. 294—58)

This invention relates to new and useful improvements in auxiliary handles for shovels or the like and has for its principal object a means to lift the load by one hand at its vertical axis to practically eliminate a fulcrum point along the handle as heretofore experienced in the use of ordinary hand shovels.

A further object of this invention is to avoid excess stooping while using the shovel.

Another object of this invention is to provide an efficient attaching means for an auxiliary handle to a shovel having a standard make of handle without mutilating the same in any way whatsoever.

A still further object of this invention is to provide an auxiliary handle, reducing the same in diameter compared with that of a standard shovel handle, whereby a lesser grip of the hand is required than for a handle of greater diameter while carrying the load; furthermore the material employed to be preferably of the aluminum alloys to avoid excess gravity action.

These and other objects will hereinafter be more fully explained, reference being had to the accompanying drawing forming a part of this specification, and wherein like characters will apply to like parts in the different views.

Referring to the drawing.

Figure 2:
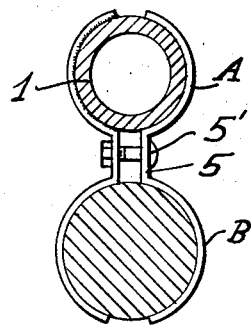
Fig. 2 is an enlarged sectional view taken on line 2—2 in Fig. 1.

The invention herein disclosed consists of an auxiliary handle having an elongated portion 1 and a shorter portion 2, the latter obliquely extending rearward and being connected to the handle of the shovel as later described. It will be seen that the elongated portion where it joins the shorter portion extends well over the vertical axis of the load 3 in the shovel portion 4, and the said elongated portion slants rearward to where it intersects the handle intermediate of the shovel and outer hand grip thereof, and being saddled thereon and secured by a clamp mechanism comprised of an arcuate portion A and an arcuate portion B, said portions being integrally connected by a shank 5 and another similar portion coacting therewith, and being positioned on the opposite side of said handles, and being secured thereto by a bolt 5' extending through the shanks as shown in Fig. 2.

Figure 1:
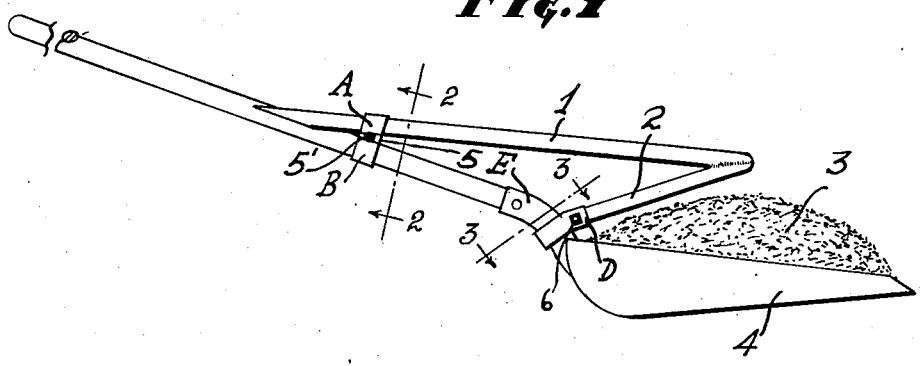
Fig. 1 is a side elevation of the auxiliary handle as applied to a shovel.
Figure 3:
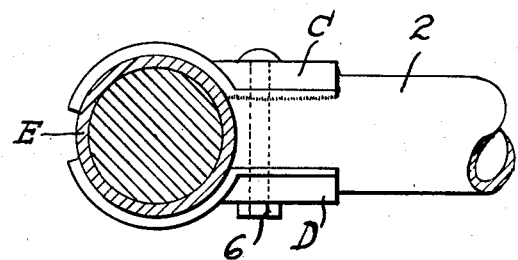
Fig. 3 is a sectional view taken on line 3—3 in Fig. 1 looking in direction of the arrows.

The corresponding ends C and D of another clamp are arced, confronting each other to engage snugly on the said free end of portion 2 and being secured thereto by a bolt 6 extending through the arced portion and end of said portion 2, the other ends of the last said clamp members being arced transversely to engage around the shank E of the shovel, as securing means thereto. It will be understood that one half of each clamping means is preferably welded to the auxiliary handle where they join the same, while the other half thereof is free to be removed, whereby the said auxiliary handle is removably secured to the shovel handle, as illustrated in Figs. 1, 2, and 3. It will now be seen that the load in the shovel may be raised by one hand by gripping the portion 1 where it joins portion 2, and the hand is free to slip longitudinally toward the outer end when the load is pitched. Furthermore, the shovel may be turned sidewise by the hand carrying the load if such movement be required, as the auxiliary handle at that point extends well upward from the shovel. It will now be seen that the attaching means for the auxiliary handle through the medium of the clamps is readily applied and removed, and furthermore, mutilation of the shovel handle, such as boring the same, will not be required, and while I have shown and described a plain nut engaging on the bolt, the same may be alternately changed to a wing nut as a convenient means to apply and remove the auxiliary handle without the use of tools, and at the same time, perform its duties efficiently, and such other modifications may be employed as lie within the scope of the appended claim.

Having fully described my invention what I claim as new and desire to secure by Letters Patent is:

In an auxiliary handle for shovels, a tubular element having one portion thereof bent back at an acute angle, the outer end of the other portion being formed to saddle on the handle of the shovel, said end portion and the free end of the first named portion each having a clamp element divided into two parts, one part of each being integrally joined to the respective end portions of the tubular elements, the other portion of the clamps removably arranged and being secured by a bolt to clamp with tight engagement on the handle of a shovel, all as and for the purpose specified.

ANTHONY F. BUSER.